US009617469B2

(12) United States Patent
Tsukatani et al.

(10) Patent No.: US 9,617,469 B2
(45) Date of Patent: *Apr. 11, 2017

(54) PHOSPHOR PARTICLES, MAKING METHOD, AND LIGHT-EMITTING DIODE

(75) Inventors: Toshihiko Tsukatani, Echizen (JP); Kazuhiro Wataya, Echizen (JP); Yasushi Takai, Echizen (JP); Takehisa Minowa, Echizen (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 1122 days.

This patent is subject to a terminal disclaimer.

(21) Appl. No.: 13/336,152

(22) Filed: Dec. 23, 2011

(65) Prior Publication Data

US 2012/0175658 A1 Jul. 12, 2012

(30) Foreign Application Priority Data

Jan. 6, 2011 (JP) ................................. 2011-001132

(51) Int. Cl.
*C09K 11/80* (2006.01)
*C09K 11/77* (2006.01)
*C01F 17/00* (2006.01)

(52) U.S. Cl.
CPC ...... *C09K 11/7774* (2013.01); *C01F 17/0025* (2013.01); *C01P 2002/52* (2013.01); *C01P 2002/72* (2013.01); *C01P 2002/84* (2013.01); *C01P 2004/03* (2013.01); *C01P 2004/32* (2013.01); *C01P 2004/50* (2013.01); *C01P 2004/61* (2013.01); *C01P 2004/62* (2013.01); *C01P 2006/80* (2013.01)

(58) Field of Classification Search
CPC .......................... C09K 11/7721; C09K 11/7774
USPC ..................................... 252/301.4 F, 301.4 R
See application file for complete search history.

(56) References Cited

U.S. PATENT DOCUMENTS

| 4,479,886 A | 10/1984 | Kasenga |
| 5,644,193 A | 7/1997 | Matsuda et al. |
| 5,851,428 A * | 12/1998 | Matsuda et al. ....... 252/301.4 R |
| 5,998,925 A | 12/1999 | Shimizu et al. |

(Continued)

FOREIGN PATENT DOCUMENTS

| CN | 1162617 A | 10/1997 |
| EP | 0221562 A2 | 5/1987 |

(Continued)

OTHER PUBLICATIONS

Wu. Spectral Properties of Various Cerium Doped Garnet Phosphors for Application in White GaN-based LEDs . Mat. Res. Soc. Symp. Proc. vol. 658 © 2001 Materials Research Society.*

(Continued)

*Primary Examiner* — Matthew E Hoban
(74) *Attorney, Agent, or Firm* — Westerman, Hattori, Daniels & Adrian, LLP (57) ABSTRACT

Phosphor particles are provided in the form of spherical polycrystalline secondary particles consisting of a multiplicity of primary particles, including a garnet phase having the compositional formula: $(A_{1-x}B_x)_3C_5O_{12}$ wherein A is Y, Gd, and/or Lu, B is Ce, Nd, and/or Tb, C is Al and/or Ga, and $0.002 \le x \le 0.2$, the secondary particles having an average particle size of 5-50 μm.

17 Claims, 6 Drawing Sheets

(56) References Cited

U.S. PATENT DOCUMENTS

| | | | |
|---|---|---|---|
| 6,660,185 | B2 | 12/2003 | Hampden-Smith et al. |
| 7,018,564 | B2 | 3/2006 | Moon et al. |
| 8,083,968 | B2 | 12/2011 | Fukuta et al. |
| 8,865,022 | B2 | 10/2014 | Tsukatani et al. |
| 2003/0049500 | A1 | 3/2003 | Takai et al. |
| 2004/0046497 | A1 | 3/2004 | Schaepkens et al. |
| 2004/0144956 | A1* | 7/2004 | Kijima .................. C09K 11/08 252/301.4 R |
| 2006/0022580 | A1* | 2/2006 | Jermann et al. ............. 313/501 |
| 2006/0166057 | A1 | 7/2006 | Kodas et al. |
| 2006/0273286 | A1 | 12/2006 | Delespierre et al. |
| 2008/0094691 | A1 | 4/2008 | Monch et al. |
| 2010/0048378 | A1 | 2/2010 | Tang et al. |
| 2010/0053932 | A1 | 3/2010 | Emoto et al. |
| 2010/0294939 | A1 | 11/2010 | Kuntz et al. |
| 2011/0305005 | A1* | 12/2011 | Tsukatani et al. ........... 362/97.3 |
| 2012/0175559 | A1 | 7/2012 | Tsukatani et al. |
| 2012/0175658 | A1 | 7/2012 | Tsukatani et al. |

FOREIGN PATENT DOCUMENTS

| | | |
|---|---|---|
| EP | 0292616 A1 | 11/1988 |
| EP | 0 936 682 A1 | 8/1999 |
| EP | 1854863 A1 | 11/2007 |
| JP | 01-108294 A | 4/1989 |
| JP | 06-009956 A | 1/1994 |
| JP | 7-45655 A | 5/1995 |
| JP | 09-235547 A | 9/1997 |
| JP | 10-036835 A | 2/1998 |
| JP | 11-043672 A | 2/1999 |
| JP | 2002-267800 A | 9/2002 |
| JP | 2004-162057 A | 6/2004 |
| JP | 3700502 B2 | 9/2005 |
| JP | 2006-41096 A | 2/2006 |
| JP | 2006-49799 A | 2/2006 |
| JP | 2007-002086 A | 1/2007 |
| JP | 2007-513038 A | 5/2007 |
| JP | 2008-007390 A | 1/2008 |
| JP | 2009-091546 A | 4/2009 |
| JP | 2012-017454 A | 1/2012 |
| KR | 10-2008-0075972 A | 8/2008 |
| WO | 2004/065324 A1 | 8/2004 |
| WO | 2005/103199 A1 | 11/2005 |
| WO | 2006/072849 A2 | 7/2006 |
| WO | 2007/083828 A1 | 7/2007 |
| WO | 2008-062781 A1 | 5/2008 |
| WO | 2009/102727 A2 | 8/2009 |
| WO | 2009/113379 A1 | 9/2009 |
| WO | 2011/063028 A1 | 5/2011 |
| WO | 2011/097137 A1 | 8/2011 |

OTHER PUBLICATIONS

Zhang. Synthesis, Luminescence, and Effect of Heat Treatment on the Properties of $Y_3Al_5O_{12}$:Ce Phosphor. Inorganic Materials, 2008, vol. 44, No. 11, pp. 1218-1223.*

Keiko. Translation of H11-043672 "Phosphor". Published on Feb. 16, 199. Machine translated by JPO onn Jan. 6, 2015.*

Japanese Office Action dated Mar. 28, 2012, issued in corresponding Japanese Patent Application No. 2011-285273.(4 pages).

Extended European Search Report "EESR" dated Feb. 19, 2014, issued in corresponding European Patent Application No. 12150151.4.

Office Action dated May 25, 2012, issued in co-pending U.S. Appl. No. 13/156,811 (7 pages).

Extended European Search Report dated Feb. 19, 2014, issued in European Patent Application No. 12150171.2 (in English, 4 pages), counterpart to U.S. Appl. No. 13/336,137.

Milosevic et al. J. Electrochem. Soc., 152(9), pp. G707-G713 (2005) (in English, 7 pages) (in co-pending U.S. Appl. No. 13/156,811).

Wang Fen et al., "Decoration and Decoration Materials of Silicate Articles", Chemical Industry Press, Aug. 2004, 1st Edition, pp. 142-144, cited in Chinese Office Action dated Mar. 25, 2015 (4 pages).

Office Action dated Dec. 7, 2012, issued in co-pending U.S. Appl. No. 13/156,811 (14 pages).

Chinese Office Action dated Apr. 29, 2014, issued in Chinese Patent Application No. 201210047417.4, counterpart to U.S. Appl. No. 13/336,137 (w/ English translation, 14 pages).

Japanese Office Action dated Apr. 16, 2013, issued in Japanese Patent Application No. 2011-120117 (w/ English machine translation, 5 pages), counterpart to U.S. Appl. No. 13/156,811.

Japanese Office Action dated Aug. 22, 2012, issued in Japanese Patent Application No. 2011-120117 (w/ English machine translation retrieved from Global Dossier Access System, 8 pages), counterpart to U.S. Appl. No. 13/156,811.

European Search Report and Written Opinion dated Sep. 7, 2011, issued in European Patent Application No. 11169218.2 (in English, 7 pages), counterpart to U.S. Appl. No. 13/156,811.

Chinese Office Action dated Sep. 15, 2015, issued in Chinese Patent Application No. 201210599373.6 (w/ English translation, 13 pages), counterpart to U.S. Appl. No. 13/724,332.

Japanese Office Action dated Dec. 9, 2014, issued in Japanese Patent Application No. 2011-281416 (w/ English machine translation retrieved from Global Dossier Access System, 4 pages), counterpart to U.S. Appl. No. 13/724,332.

Extended European Search Report dated Apr. 4, 2013, issued in European Patent Application No. 12198260.7 (in English, 6 pages), counterpart to U.S. Appl. No. 13/724,332.

Office Action dated Jan. 21, 2016, issued in co-pending U.S. Appl. No. 13/724,332 (16 pages).

Office Action dated Sep. 4, 2015, issued in co-pending U.S. Appl. No. 13/724,332 (12 pages).

Office Action dated Jan. 2, 2015, issued in co-pending U.S. Appl. No. 13/156,811 (7 pages).

Office Action dated Jun. 21, 2013, issued in co-pending U.S. Appl. No. 13/156,811 (12 pages).

Wang Fen et al., "Decoration and Decoration Materials of Silicate Articles", Chemical Industry Press, Aug. 2004, 1st Edition, p. 142, cited in Chinese Office Action dated Mar. 25, 2015 (4 pages).

Chinese Office Action dated Mar. 25, 2015, issued in corresponding CN Patent Application No. 201210063855.X, w/ English translation (14 pages).

Japanese Office Action dated Mar. 24, 2015, issued in corresponding Japanese Divisional Patent Application No. 2012-116646 (with partial machine English translation) (6 pages).

* cited by examiner

PHOSPHOR PARTICLES, MAKING METHOD, AND LIGHT-EMITTING DIODE

CROSS-REFERENCE TO RELATED APPLICATION

This non-provisional application claims priority under 35 U.S.C. §119(a) on Patent Application No. 2011-001132 filed in Japan on Jan. 6, 2011, the entire contents of which are hereby incorporated by reference.

TECHNICAL FIELD

This invention relates to phosphor particles suitable for use in illuminating devices such as general purpose light sources, backlight sources and headlight sources, and light-emitting diodes, and more particularly in illuminating devices including a phosphor capable of converting the wavelength of emission from a light source, and white light-emitting diodes; a method of preparing the phosphor particles; and a light-emitting diode using the phosphor particles.

BACKGROUND ART

Light-emitting diodes (LEDs) are the most efficient among currently available light sources. In particular, white LEDs find a rapidly expanding share in the market as the next-generation light source to replace incandescent lamps, fluorescent lamps, cold cathode fluorescent lamps (CCFL), and halogen lamps. The white LEDs are arrived at by combining a blue LED with a phosphor capable of emission upon blue light excitation. In the current mainstream industry, yellow light-emitting phosphors are combined with blue LEDs to produce pseudo-white light. Examples of suitable yellow light-emitting phosphors include $Y_3AlO_{12}:Ce$, $(Y,Gd)_3(Al,Ga)_5O_{12}:Ce$, $(Y,Gd)_3Al_5O_{12}:Ce$, $Tb_3Al_5O_{12}:Ce$, $CaGa_2S_4:Eu$, $(Sr,Ca,Ba)_2SiO_4:Eu$, and $Ca$-$\alpha$-$SiAlON:Eu$.

JP 3700502 discloses a method for preparing a phosphor by dissolving rare earth elements Y, Gd, and Ce in stoichiometric proportions in an acid, co-precipitating the solution with oxalic acid, firing the co-precipitate to obtain an oxide of the co-precipitate, mixing it with aluminum oxide, and adding ammonium fluoride as flux thereto. The mixture is placed in a crucible and fired in air at 1,400° C. for 3 hours. The fired material is wet milled in a ball mill, washed, separated, dried, and finally sieved.

When a phosphor is synthesized by such a conventional method of particle mixing and solid-phase reaction, individual particles are single crystal particles having a smooth crystal face because the particle size is controlled by crystal growth in the flux. For this reason, part of incident light is reflected, which becomes an inhibitory factor against further improvement in absorptance. On use, the phosphor is mixed with an encapsulating resin, and a layer of the phosphor-dispersed resin is formed on blue LED. Due to a difference in thermal expansion between the phosphor and the encapsulating resin, a material interface stress is generated to gradually detract from bond strength. This results in interfacial separation between the phosphor and the encapsulating resin, creating a gas phase at the interface, which causes to reduce the efficiency of light extraction from the phosphor.

Further, in the conventional solid-phase method, a large amount of flux component is mixed for grain growth purpose. This raises a problem that some flux component is left even after conversion of the source powder into a phosphor and washing away of the flux component. When an LED device is prepared by mixing the phosphor with a resin and molding the resin on a LED chip which generates exciting light, the residual flux component becomes a factor of reducing the efficiency of extraction of phosphor emission outside the LED device because the flux component is not a fraction that is emissive in response to excitation light.

CITATION LIST

Patent Document 1: JP 3700502 (U.S. Pat. No. 5,998,925, EP 0936682)

SUMMARY OF INVENTION

An object of the invention is to provide a particulate phosphor material which is improved in phosphor purity, and which when dispersed in media for light emitting diodes such as resins for encapsulating a light emitter, and resins or inorganic glass for dispersing phosphor particles, is improved in the absorptance of exciting light and minimized in the separation between phosphor particles and encapsulating resin during long-term service; a method of preparing the phosphor particles; and a light-emitting diode including the phosphor particles.

The inventors have found that when phosphor particles in the form of spherical polycrystalline secondary particles consisting of a multiplicity of primary particles, containing a garnet phase having the compositional formula (1):

$$(A_{1-x}B_x)_3C_5O_{12} \quad (1)$$

wherein A is at least one rare earth element selected from Y, Gd, and Lu, B is at least one rare earth element selected from Ce, Nd, and Tb, C is Al and/or Ga, and x is a number of 0.002 to 0.2, and having an average particle size of 5 to 50 μm are dispersed in media such as resins for encapsulating a light emitter, and resins or inorganic glass for dispersing phosphor particles, the absorptance of exciting light is improved and the separation between phosphor particles and encapsulating resin is restrained during long-term service. The phosphor particles are advantageously used in white LED construction as a yellow light-emitting phosphor capable of emission upon excitation by light from a blue LED.

The inventors have also found that such phosphor particles of high purity can be prepared by providing a powder oxide or oxides containing one or more of the elements A, B, and C in compositional formula (1) as a starting material, using one powder oxide in which the elements A, B, and C are present in a ratio of compositional formula (1) or mixing two or more powder oxides such that the elements A, B, and C may be present in a ratio of compositional formula (1), granulating the powder oxide or powder oxide mixture into granules with an average particle size of 5 to 65 μm, melting the granules in a plasma and solidifying outside the plasma, obtaining spherical particles, and heat treating the particles in a non-oxidizing atmosphere at a temperature of 900 to 1,700° C.

In one aspect, the invention provides phosphor particles in the form of spherical polycrystalline secondary particles consisting of a multiplicity of primary particles, including a garnet phase having the compositional formula (1):

$$(A_{1-x}B_x)_3C_5O_{12} \quad (1)$$

wherein A is at least one rare earth element selected from the group consisting of Y, Gd, and Lu, B is at least one rare earth element selected from the group consisting of Ce, Nd, and Tb, C is at least one element selected from the group consisting of Al and Ga, and x is a number of 0.002 to 0.2, the secondary particles having an average particle size of 5 to 50 μm.

In preferred embodiments, the primary particles have a particle size of 0.1 to 5 μm; the polycrystalline secondary particles have a surface average protrusion height of 0.02 to 2 μm; the phosphor particles have a barium content of up to 10 ppm; and the phosphor particles have an absorptance of at least 90% and an external quantum efficiency of at least 85% at an excitation wavelength of 450 nm and an emission wavelength in the range of 480 to 780 nm.

Also contemplated herein is a light-emitting diode including a light emitter and a layer, the layer being disposed in a light emission path of the light emitter, the layer being made of the phosphor particles defined above alone or dispersed in a resin or inorganic glass.

In another aspect, the invention provides a method for preparing the phosphor particles defined above, including the steps of providing a powder oxide or oxides containing one or more of the elements A, B, and C in compositional formula (1) as a starting material, using one powder oxide in which the elements A, B, and C are present in a ratio of compositional formula (1) or mixing two or more powder oxides such that the elements A, B, and C may be present in a ratio of compositional formula (1), granulating the powder oxide or powder oxide mixture into granules with an average particle size of 5 to 65 μm, melting the granules in a plasma and solidifying outside the plasma, thereby obtaining spherical particles, and heat treating the particles in a non-oxidizing atmosphere at a temperature of 900 to 1,700° C.

Typically no flux is added to the powder oxide or powder oxide mixture.

ADVANTAGEOUS EFFECTS OF INVENTION

Even when dispersed in media such as resins and inorganic glass, the phosphor particles have an improved absorptance of exciting light. The separation between phosphor particles and encapsulating resin caused by a material interface stress due to a difference in thermal expansion between the phosphor and the resin is restrained. The efficiency of light extraction from LED is improved because of the absence of an impurity fraction resulting from flux and not contributing to emission.

DESCRIPTION OF EMBODIMENTS

As used herein, the term "phosphor" refers to a fluorescent substance. The terms "particles" and "powder" are equivalent in that the powder is a grouping of particles. The particulate phosphor material of the invention is in the form of spherical polycrystalline secondary particles consisting of a multiplicity of primary particles, including a garnet phase having the compositional formula (1):

$$(A_{1-x}B_x)_3C_5O_{12} \tag{1}$$

wherein A is at least one rare earth element selected from the group consisting of yttrium (Y), gadolinium (Gd), and lutetium (Lu), B is at least one rare earth element selected from the group consisting of cerium (Ce), neodymium (Nd), and terbium (Tb), C is at least one element selected from the group consisting of aluminum (Al) and gallium (Ga), and x is a number of 0.002 to 0.2.

The phosphor particles including a garnet phase are prepared by providing a powder oxide or oxides containing one or more of the elements A, B, and C in compositional formula (1) as a starting material, using one powder oxide in which the elements A, B, and C are present in a ratio of compositional formula (1) or mixing two or more powder oxides such that the elements A, B, and C may be present in a ratio of compositional formula (1), granulating the powder oxide or powder oxide mixture into granules with an average particle size of 5 to 65 μm, melting the granules in a plasma and solidifying outside the plasma, thereby obtaining spherical particles, and heat treating the particles in a non-oxidizing atmosphere at a temperature of 900 to 1,700° C.

Two or more starting oxides are mixed such that the elements A, B, and C may be present in a ratio of compositional formula (1). The mixture is granulated. The granules are passed through a plasma where they are melted and become droplets. As the droplets move past the plasma, they are cooled and solidified. Once melted and solidified, the granules transform to composite oxide particles of amorphous nature. There are formed spherical particles having a size which ranges from the size of granules with an average particle size of 5 to 65 μm. Unlike the conventional method of preparing phosphor particles by mixing starting oxides with a flux in solid state and firing the oxides in the flux for thereby mixing the respective elements, the inventive method is characterized by introducing granules into a plasma and solidifying again, whereby spherical particles having an average particle size of 5 to 50 μm are formed in an amorphous state having respective elements uniformly dispersed. A minimal variation of composition among particles is also characteristic.

The spherical particles as solidified are then heat treated in a non-oxidizing atmosphere at a temperature of 900 to 1,700° C., yielding spherical crystalline particles containing a garnet phase of compositional formula (1).

The spherical particles as heat treated are available as polycrystalline secondary particles since they are obtained from formation of a multiplicity of minute crystalline primary particles upon crystallization and agglomeration of such primary particles.

The primary particles specifically have a particle size of 0.1 to 5 μm and more specifically 0.3 to 3 μm. The secondary particles specifically have an average particle size of 5 to 50 μm and more specifically 10 to 30 μm.

Also preferably, the phosphor particles have a surface average protrusion height of 0.02 to 2 μm and more preferably 0.05 to 1 μm. The "surface average protrusion height" is defined as follows. A cross section of phosphor particles is taken, for example, by mixing phosphor particles with an epoxy resin, curing the resin, and grinding the cured epoxy resin having phosphor particles dispersed and buried therein by means of a surface grinding machine. Then cross-sections of particles appear on the ground surface. If a photomicrograph of the cross section is taken, measurement is possible.

Since a secondary particle is composed of agglomerated primary particles, the outer periphery in cross section of the secondary particle has microscopic asperities. Two valleys (lowest points) included between one primary particle and two adjacent primary particles are connected to define a straight line. The height of a perpendicular line from the straight line to the peak (highest point) of the one primary particle is measured, giving a protrusion height. Plural measurements are performed and averaged to give a surface average protrusion height.

Since the phosphor particles are polycrystalline, grain boundaries exist on the phosphor surface and in the interior, and the surface defines a surface profile including protrusions corresponding to crystal grains. By letting crystal grains grow to enlarge surface asperities, the absorptance may be improved. If light enters a recess, the light is reflected several times within the recess and absorbed on every reflection. Thus the energy of light entering a recess is almost absorbed until the light goes out of the recess. For this reason, an irregular surface provides a higher absorptance.

The prior art method of preparing phosphor particles has a problem associated with the inevitable addition of a flux during the steps of mixing source oxides and firing. If the flux is used, the element which should essentially be introduced into the garnet phase of phosphor particles can be taken into a fraction not contributing to fluorescence, and specifically combined with a component of the flux to form a crystal or the like. This means that phosphor particles contain more a fraction not contributing to emission.

The method of the invention is successful in preparing phosphor particles without a need of adding or mixing a material other than those included in the phosphor composition, that is, avoids incorporation of any impurity ingredients such as incorporation of barium fluoride impurity typically used in the flux method. In the solid-phase synthesis method using barium fluoride or the like as the flux, even when an attempt is made to wash away the flux component with deionized water or acid after the synthesis of phosphor particles, part of the flux component can be combined with aluminum in the phosphor source material to form an insoluble compound, which is left in the product. In contrast, the phosphor of the invention is in the form of spherical polycrystalline particles having a minimal content of impurity element other than the phosphor components, for example, a barium content of not more than 10 ppm. The absence of any impurity on grain boundaries ensures full transmission of exciting light entering phosphor particles. Therefore the polycrystalline phosphor particles have a high absorptance and contribute to emission in their entirety from the surface to the center.

The garnet phase of compositional formula (1) included in the phosphor particles is the major phase among crystal phases in the phosphor particles. Preferably the garnet phase accounts for at least 99% by volume of all crystal phases.

It is now described how to produce phosphor particles. Phosphor particles are prepared by first selecting a metal oxide(s) from single metal oxides, composite metal oxides, and metal oxide mixtures in accordance with the metal species in the desired phosphor particles, to provide a phosphor-forming composition. The phosphor-forming composition is dispersed in deionized water or an organic solvent to form a slurry.

The composite metal oxide or metal oxide mixture may be prepared, for example, by the following method. A co-precipitate is first prepared by selecting suitable metal salts from salts of metal elements to constitute the phosphor particles (for example, nitrates and chlorides of Y, Gd, Lu, Ce, Nd, Tb, Al, and Ga), dissolving the metal salts in water, and co-precipitating the aqueous solution. Alternatively, it may be prepared by selecting suitable starting materials from the metal salts and metal oxides described above, forming an aqueous solution or slurry thereof, and co-precipitating the aqueous solution or slurry. The resulting co-precipitate is fired at 800 to 1,500° C. in air, obtaining the composite oxide or oxide mixture. The firing time is usually 1 to 10 hours.

If necessary, organic additives such as dispersant and binder may be added to the slurry of the phosphor-forming composition. The slurry may be optionally milled into a slurry of fine particles preferably having an average particle size of 0.01 to 2.0 µm. By a granulation technique, generally spherical granules (precursor) of the desired particle size may be prepared from the slurry. Suitable granulation techniques include air atomizing with two-fluid nozzle or four-fluid nozzle, fluidized-bed granulation, centrifugal atomization, tumbling granulation, agitation granulation, compression granulation (such as by rubber or isostatic pressing), extrusion granulation, and disintegration granulation. The granules are compositionally uniform among them due to granulation from slurry. The granules preferably have a size of 5 to 65 µm, specifically a size substantially equivalent to the phosphor particles obtained therefrom after heat treatment, more specifically an average particle size corresponding to 100 to 130% of that of phosphor particles after heat treatment.

The granules are passed through a plasma where they are melted into droplets. The plasma source used herein may be a high-frequency plasma or direct-current plasma. The temperature of the plasma should be higher than the melting points of the source metal oxides including rare earth oxides, aluminum oxide, and gallium oxide.

Past the plasma, the droplets are cooled and solidified into particles again. These particles are spherical amorphous particles which exhibit very broad peaks on X-ray diffraction analysis. The particles as such have a low phosphor quantum efficiency, which is usually as low as 40 to 60%. Also the absorptance of exciting light is as low as 50 to 70%. Therefore, the particles resulting from plasma melting must be heat treated in a non-oxidizing atmosphere, for example, a rare gas atmosphere such as argon or helium, a nitrogen atmosphere, or a similar atmosphere in which the inert gas is, in part, replaced by a reducing gas such as hydrogen before the desired crystalline phosphor particles can be obtained. A non-oxidizing atmosphere is used as the heat treating atmosphere to avoid oxidation of the elements serving as the luminescent center such as Ce, Nd and Tb.

The temperature of heat treatment should be 900° C. or higher, preferably 1,000° C. or higher to provide for full crystal growth in phosphor particles. Since the fusion of phosphor particles can adversely affect the distribution of particle size of phosphor particles, the heating temperature should be up to 1,700° C., preferably up to 1,650° C., and more preferably up to 1,600° C. The heat treatment may be carried out in two or more divided modes for purposes of preventing fusion of phosphor particles.

The phosphor particles of the invention may be used in a light-emitting device, typically LED. For example, the phosphor particles are suited for use as a wavelength converting material to form a layer of phosphor particles alone or of phosphor particles dispersed in resin or inorganic glass, in a light emission path of a light emitter capable of emitting excitation light and typically as a phosphor for wavelength conversion of LED. When phosphor particles are dispersed in media such as resins (e.g., epoxy resins and silicone resins) and inorganic glass in order to overlay the light emitter with a phosphor layer, advantageously the particles are uniformly dispersed in the medium and uniformly distributed in the layer. The layer is characterized by a minimized variation of phosphor particle distribution.

The phosphor particles thus obtained have an absorptance of at least 90% of exciting light and an external quantum efficiency of at least 85% at an excitation wavelength of 450 nm and an emission wavelength in the range of 480 to 780 nm.

The phosphor particles are suited as a phosphor for converting the wavelength of light from a light-emitting element of a LED. Thus, the phosphor particles can be advantageously used in a LED, and an illuminating device and a backlight device may be fabricated using the LED.

EXAMPLE

Examples are given below by way of illustration and not by way of limitation.

Example 1

In a ball mill, 1,000 g of a composite oxide fine powder of $(Y_{2.94}Ce_{0.06})Al_5O_{12}$ having a purity of 99.9% and an average particle size of 1.0 μm was milled for 6 hours together with 1,500 g of deionized water, 10 g of poly (ammonium acrylic acid), and 2 g of carboxymethyl cellulose. Using a centrifugal atomizer, the resulting slurry was granulated into granules having an average particle size of 21 μm. The granules were heat treated in air at 1,400° C. for 2 hours to burn off the organic matter.

The granules were fed into a DC arc plasma where they were melted and then solidified again, recovering spherical particles.

The spherical particles were annealed in a reducing atmosphere of 99 vol % of argon gas and 1 vol % of hydrogen gas at 1,400° C. for 4 hours, yielding phosphor particles capable of emitting yellow light in response to blue exciting light.

Figure 1:
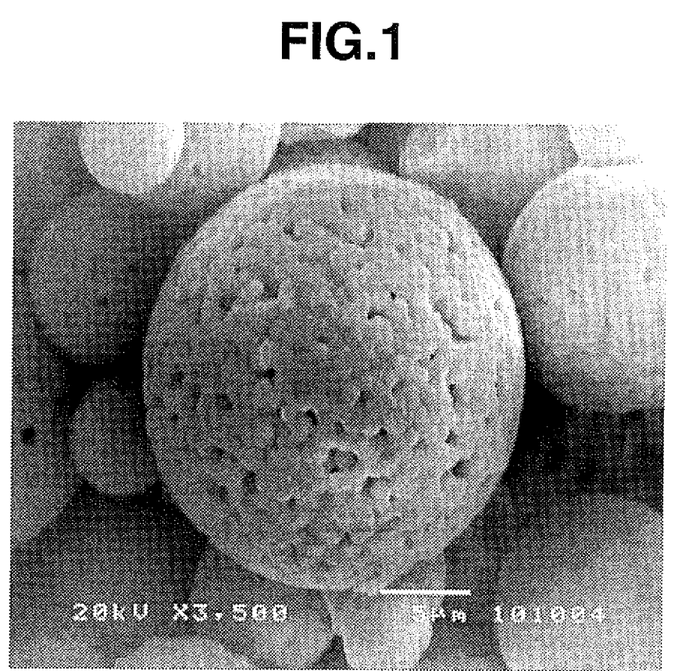
FIG. 1 is an electron micrograph of phosphor particles in Example 1.
Figure 2:
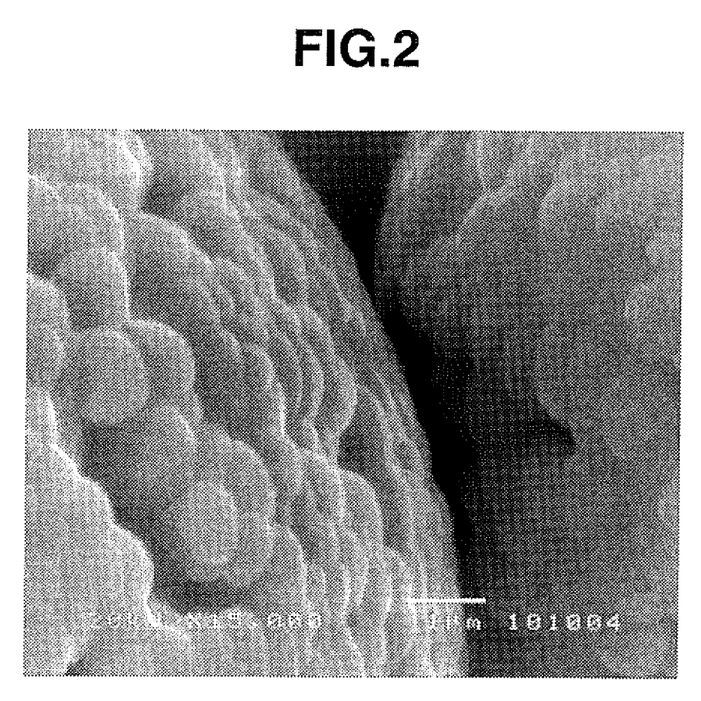
FIG. 2 is an electron micrograph with greater magnification of phosphor particles in Example 1.
Figure 3:
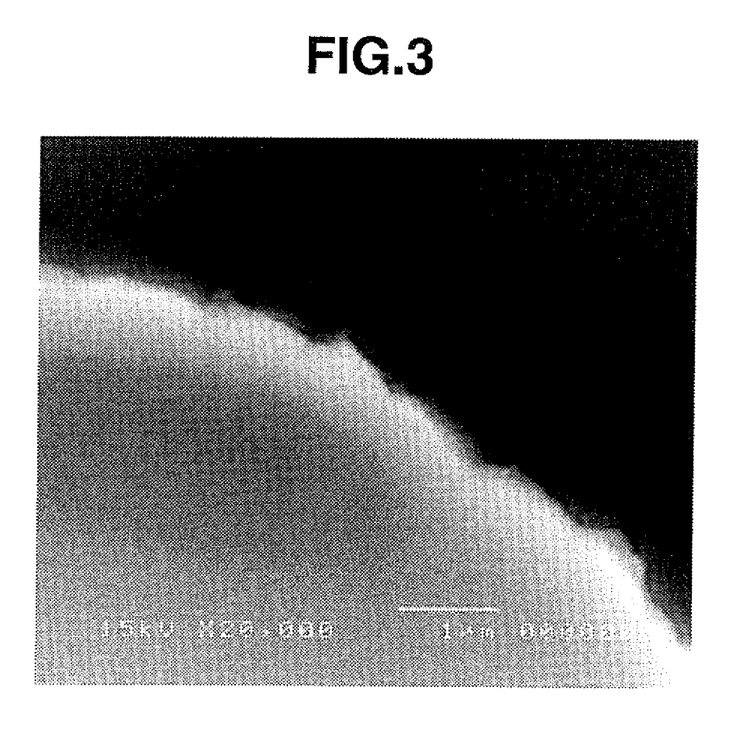
FIG. 3 is an electron micrograph in cross section of a phosphor particle in Example 1.

The phosphor particles thus obtained were observed under an electron microscope. Photomicrographs are shown in FIGS. 1 to 3. It is evident from these photomicrographs that each phosphor particle is a secondary particle composed of agglomerated primary particles and has a spherical or substantially spherical shape. The average particle size of phosphor particles was measured by the laser diffraction method. From the microscopic image, the diameter of primary particles of which the phosphor particles were composed was measured, after which an average particle size of 20 primary particles was computed. From the microscopic image of FIG. 3, the height of 10 protrusions on each particle was measured for 10 phosphor particles. An average of total 100 protrusion heights was computed and reported as a surface average protrusion height. The results are shown in Table 1.

Figure 4:
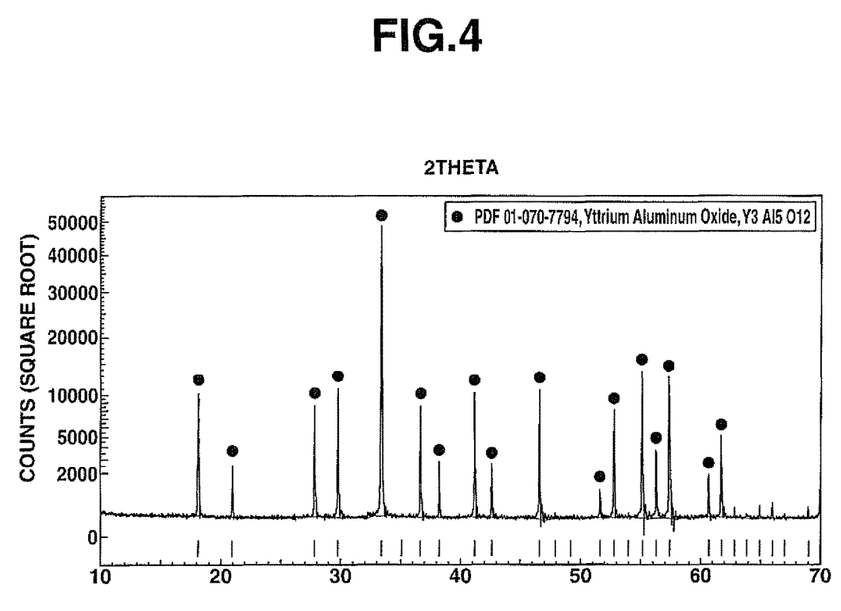
FIG. 4 is an X-ray diffraction profile of phosphor particles in Example 1.

The phosphor particles were qualitatively analyzed by XRD, finding a single YAG phase $((Y_{2.94}Ce_{0.06})Al_5O_{12}$, garnet phase). The XRD profile is shown in FIG. 4.

An absorptance, internal quantum efficiency, and external quantum efficiency of the phosphor particles were measured over an emission wavelength range of 480 to 780 nm at an excitation wavelength of 450 nm using an integrating sphere. The result is also shown in Table 1.

Comparative Example 1

A powder mixture, 1,000 g, was obtained by mixing a yttrium oxide $(Y_2O_3)$ powder of 99.9% purity having an average particle size of 1.0 μm, an aluminum oxide $(Al_2O_3)$ powder of 99.0% purity having an average particle size of 0.5 μm, and a cerium oxide $(CeO_2)$ powder of 99.9% purity having an average particle size of 0.2 μm in such amounts to give a molar ratio Y:Al:Ce of 2.94:5:0.06. Further 20 g of barium fluoride was added as flux to the powder mixture, which was thoroughly milled. The mixture was fed in an aluminum crucible and heat treated in air at 1,400° C. for 5 hours. The fired body was disintegrated in water using a ball mill. This was followed by pickling, water washing, separation, drying and classification, obtaining phosphor particles.

Figure 5:
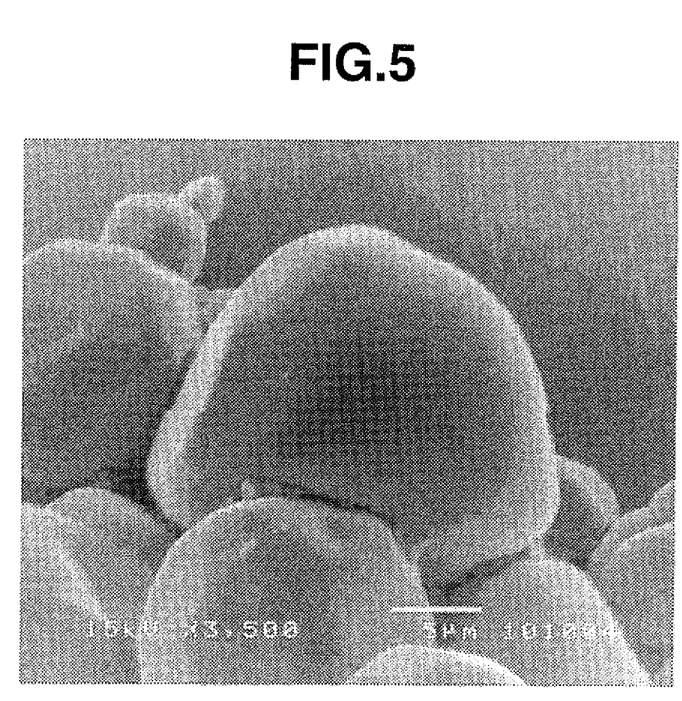
FIG. 5 is an electron micrograph of phosphor particles in Comparative Example 1.

The phosphor particles thus obtained were observed under an electron microscope. A photomicrograph is shown in FIG. 5. The phosphor particles were single crystals. No grain boundaries were observed on both the cross section and the surface, and no protrusions were observed. The average particle size of phosphor particles was measured by the laser diffraction method. The results are also shown in Table 1.

Figure 6:
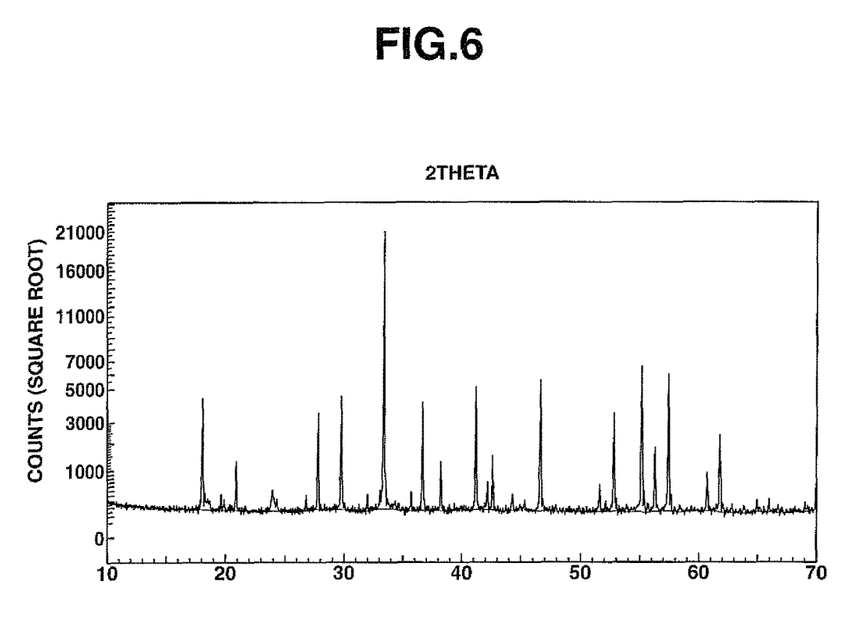
FIG. 6 is an X-ray diffraction profile of phosphor particles in Comparative Example 1.

The phosphor particles were qualitatively analyzed by XRD and found to contain a YAG phase $((Y_{2.94}Ce_{0.06})Al_5O_{12}$, garnet phase) as the major phase and a barium/ aluminum composite oxide phase as the second phase. The XRD profile is shown in FIG. 6. It is proven from this result that aluminum was chemically combined with the flux component.

An absorptance, internal quantum efficiency, and external quantum efficiency of the phosphor particles were measured over an emission wavelength range of 480 to 780 nm at an excitation wavelength of 450 nm using an integrating sphere. The result is also shown in Table 1.

TABLE 1

| | Average particle size (μm) | Primary particle size (μm) | Surface average protrusion height (μm) | XRD impurity phase | Absorptance (%) | Internal quantum efficiency (%) | External quantum efficiency (%) |
|---|---|---|---|---|---|---|---|
| Example 1 | 18.4 | 1.3 | 0.23 | nil | 0.93 | 0.96 | 0.89 |
| Comparative Example 1 | 19.3 | — | — | Ba/Al composite oxide | 0.85 | 0.90 | 0.77 |

Japanese Patent Application No. 2011-001132 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. Phosphor particles in the form of spherical polycrystalline secondary particles consisting of a plurality of primary particles, the phosphor particles comprising a garnet phase having the compositional formula (1):

$$(A_{1-x}B_x)_3C_5O_{12} \tag{1}$$

wherein A is at least one rare earth element selected from the group consisting of Y, Gd, and Lu, B is at least one rare earth element selected from the group consisting of Ce, Nd, and Tb, C is at least one element selected from the group consisting of Al and Ga, and x is a number of 0.002 to 0.2, wherein
the secondary particles have an average particle size of 5 to 50 μm, and
the phosphor particles have an absorptance of at least 90% and an external quantum efficiency of at least 85% at an excitation wavelength of 450 nm and an emission wavelength in the range of 480 to 780 nm.

2. The phosphor particles of claim 1 wherein said primary particles have a particle size of 0.1 to 5 μm.

3. The phosphor particles of claim 1 wherein said polycrystalline secondary particles have a surface average protrusion height of 0.02 to 2 μm.

4. The phosphor particles of claim 1, wherein the phosphor particles have a barium content of up to 10 ppm.

5. A light-emitting diode comprising a light emitter and a layer, the layer being disposed in a light emission path of the light emitter, the layer being made of the phosphor particles of claim 1.

6. A method for preparing the phosphor particles of claim 1, comprising the steps of:
providing a powder oxide or oxides containing one or more of the elements A, B, and C in compositional formula (1) as a starting material,
using one powder oxide in which the elements A, B, and C are present in a ratio of compositional formula (1) or mixing two or more powder oxides such that the elements A, B, and C may be present in a ratio of compositional formula (1),
granulating the powder oxide or powder oxide mixture into spherical granules as precursors to the secondary particles, with an average particle size of 5 to 65 μm,
melting the spherical granules in a plasma and solidifying outside the plasma, thereby obtaining spherical particles, and
heat treating the spherical particles in a non-oxidizing atmosphere at a temperature of 900 to 1,700° C.

7. The method of claim 6 wherein no flux is added to the powder oxide or powder oxide mixture.

8. A light-emitting diode comprising a light emitter and a layer, the layer being disposed in a light emission path of the light emitter and comprising the phosphor particles of claim 1 dispersed in a resin or inorganic glass.

9. The phosphor particles of claim 1,
wherein precursors to the secondary particles have an average particle size that is 100 to 130% of the average particle size of the secondary particles, and
wherein the precursors are melted in a plasma, solidified outside the plasma, and heat-treated to obtain the secondary particles.

10. The phosphor particles of claim 1,
wherein the phosphor particles are prepared by a method comprising the steps of:
providing a powder oxide or oxides containing one or more of the elements A, B, and C in compositional formula (1) as a starting material,
using one powder oxide in which the elements A, B, and C are present in a ratio of compositional formula (1) or mixing two or more powder oxides such that the elements A, B, and C may be present in a ratio of compositional formula (1),
granulating the powder oxide or powder oxide mixture into spherical granules as precursors to the secondary particles, with an average particle size of 5 to 65 μm,
melting the spherical granules in a plasma and solidifying outside the plasma, thereby obtaining spherical particles, and
heat treating the spherical particles in a non-oxidizing atmosphere at a temperature of 900 to 1,700° C.

11. The phosphor particles of claim 10, wherein the non-oxidizing atmosphere is a rare gas atmosphere of which a part of the rare gas is replaced by a reducing gas.

12. The phosphor particles of claim 10, wherein the method further comprises the step of forming an aqueous solution of a phosphor-forming composition comprising the powder oxide or powder oxide mixture, prior to the granulating step.

13. The phosphor particles of claim 10, wherein the method further comprises the step of forming a slurry of a phosphor-forming composition comprising the powder oxide or powder oxide mixture, prior to the granulating step, and the phosphor-forming composition has an average particle size of 0.01 to 2.0 μm.

14. The method of claim 6, wherein the non-oxidizing atmosphere is a rare gas atmosphere of which a part of the rare gas is replaced by a reducing gas.

15. The method of claim 6, wherein the method further comprises the step of forming an aqueous solution of a phosphor-forming composition comprising the powder oxide or powder oxide mixture, prior to the granulating step.

16. The method of claim 6, wherein the method further comprises the step of forming a slurry of a phosphor-forming composition comprising the powder oxide or powder oxide mixture, prior to the granulating step, and the phosphor-forming composition has an average particle size of 0.01 to 2.0 μm.

17. The method of claim 6, wherein the precursors to the secondary particles have an average particle size that is 100 to 130% of the average particle size of the secondary particles.

* * * * *